United States Patent [19]

Hirata

[11] 4,417,193

[45] Nov. 22, 1983

[54] METHOD AND APPARATUS FOR CONTROLLING ALTERNATING CURRENT MOTORS

[75] Inventor: Akio Hirata, Fuchu, Japan

[73] Assignee: Tokyo Shibaura Denki Kabushiki Kaisha, Kanagawa, Japan

[21] Appl. No.: 290,195

[22] Filed: Aug. 5, 1981

[30] Foreign Application Priority Data

Aug. 29, 1980 [JP] Japan .................. 55-118294

[51] Int. Cl.³ ............................................. H02P 5/40
[52] U.S. Cl. ........................... 318/803; 318/806; 318/808
[58] Field of Search ................... 318/803–811, 318/798–802, 340, 388, 404, 415, 762, 798, 341, 270, 318

[56] References Cited

U.S. PATENT DOCUMENTS 3,781,616  12/1973  Mokrytzki ..................... 318/801
4,243,927   1/1981  D'Atre ......................... 318/803

FOREIGN PATENT DOCUMENTS 52-28617   3/1977  Japan ......................... 318/803
55-127896 10/1980  Japan ......................... 318/806

Primary Examiner—J. V. Truhe
Assistant Examiner—Patrick Keane
Attorney, Agent, or Firm—Stevens, Davis, Miller & Mosher

[57] ABSTRACT

In a method and apparatus for controlling a speed of an AC motor energized by a source of alternating current through a frequency converter, a limiter responsive to input voltage and input current is provided for decreasing a primary frequency at a rate faster than a rate of decrease in a number of revolutions of the motor when the source is interrupted for a short interval and for accelerating the motor with a primary current thereof limited to a predetermined value while maintaining the primary frequency and the primary current in a predetermined relation.

6 Claims, 7 Drawing Figures

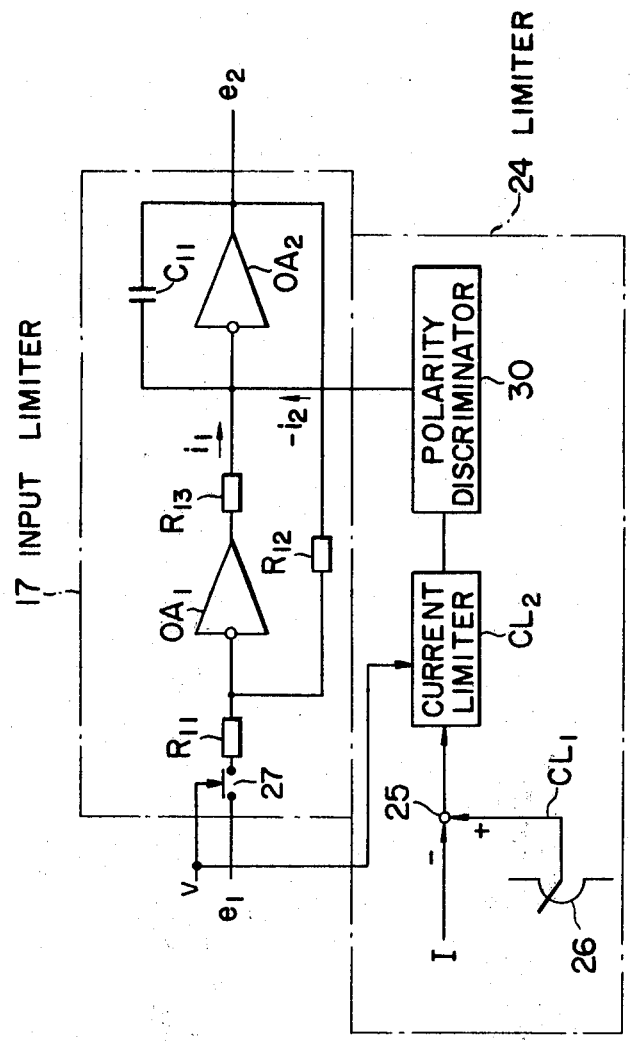
F I G. 7

METHOD AND APPARATUS FOR CONTROLLING ALTERNATING CURRENT MOTORS

BACKGROUND OF THE INVENTION

This invention relates to a method and apparatus for controlling the speed of an alternating current (AC) motor with a frequency changer.

The term AC motor utilized herein includes a synchronous motor and an induction motor, and as a frequency changer may be used a current type inverter, a voltage type inverter, a cycloconverter or the like.

FIG. 1 shows an example of a prior art control apparatus of an AC motor which comprises an AC source 11, a rectifier 12, a DC reactor 13, an inverter 14, an induction motor 15, a speed reference setter 16 comprising a variable resistor which sets a desired speed reference an input limiter 17, a frequency controller 18, an output voltage controller 19, an output voltage detector 20, an input current detector 21 in the form of a current transformer, and an input voltage detector 22 which are connected as shown. The control apparatus shown in FIG. 1 is used to control the speed of the induction motor 15 by using a current type inverter in which the AC input from the source 11 is rectified by the rectifier 12, the output DC thereof being smoothed by the DC reactor 13 and then inverted by the inverter 14 into an AC power supplied to the induction motor 15. The AC power supplied to the induction motor 15 is controlled by an output voltage frequency reference signal $e_2$ obtained by comparing a reference signal $e_1$ set by the speed reference setter 16 with an input voltage signal in the input limiter 17. The primary frequency of the voltage supplied to the induction motor 15 is determined by varying a gate signal supplied to thyristors constituting the inverter 14 from the frequency controller 18 according to the output voltage frequency reference signal $e_2$. On the other hand, the primary voltage supplied to the induction motor 15 is controlled by controlling the gate signals applied to the thyristors constituting the rectifier 12 from the output voltage controller 19 according to the output voltage frequency reference signal $e_2$. Thus, the primary voltage detected by the output voltage detector 20 is compared with the output voltage frequency reference signal $e_2$ with a comparator 23 in a closed voltage controlling loop, while current is controlled by a minor closed current controlling loop including input current detector 21 so that the output current of the rectifier 12 would not exceed a predetermined value. More particularly, when the output current of the rectifier is caused to increase by a short circuit or an overload of the motor 15, the output current is limited to be less than the predetermined value regardless of the output voltage frequency reference signal $e_2$ by decreasing the output voltage of the rectifier 12. In other words, within a predetermined output current, the primary voltage and the primary frequency of the induction motor 15 are controlled in a predetermined manner according to the output voltage frequency signal $e_2$, whereas when the output current tends to increase beyond the predetermined value, the primary voltage is decreased to limit the output current.

The variation in the output voltage of the AC source 11 is detected by the input voltage detector 22. Thus, when the operation of the source 11 is stopped momentarily, the voltage detector 22 momentarily stops the operation of the frequency converter. Such operation mode is illustrated in FIG. 2, in which curve (a) shows the voltage of the AC source 11, (b) a running signal, (c) the number of revolutions of the induction motor 15 and (d) the output voltage frequency reference signal $e_2$. Suppose now that the voltage of the source 11 decreases below the predetermined value at a time $t_1$ and that the voltage resumes the predetermined value at a time $t_2$, then during an interval $T_c$ between $t_1$ and $t_2$, the operations of the rectifier 12 and the inverter 14 would be interrupted, and during this interval the number of revolutions of the induction motor 15 decreases by $\Delta N$. For this reason, the output voltage frequency reference signal $e_2$ is also decreased by $\Delta E$ during this interval to a value corresponding to the number of revolutions of the induction motor. This is caused by the torque T-primary current characteristic I of the motor 15 shown in FIG. 3, in which the abscissa represents the number of revolutions N and the ordinate the torque T and the primary current I of the induction motor. When the primary frequency of the induction motor 15 is $F_1$, the torque is designated by $T_1$, the primary current by $I_1$, and the synchronous speed by $N_{01}$, whereas when the primary frequency is $F_2$, the torque is designated by $T_2$, the primary current by $I_2$, and the synchronous speed by $N_{02}$, where $F_1 < F_2$. When the primary current is limited to $I_{21}$ for the primary frequency $F_2$ the torque T is the same as $T_2$ between a speed range of $N_{21}$–$N_{22}$, but in other speed ranges the generated torque decreases by an amount shown by hatched portions.

Suppose now that the motor 15 running with the primary frequency $F_2$ up to time $t_1$, stops running during the interval $T_c$ and restarts at time $t_2$ with the primary frequency $F_2$. Under these conditions, where the speed of the motor 15 is higher than $N_{21}$ immediately prior to time $t_2$, it is easy to return the motor speed to that prior to time $t_1$, whereas when the speed has been reduced to a value less than $N_{21}$ the output current of the inverter 14 (i.e., rectifier 12) would be limited to $I_{21}$ with the result that the torque T of the motor decreases, thus making it impossible to resume the number of revolutions before time $t_1$. Accordingly, when the primary frequency is decreased to $F_1$ from $F_2$ corresponding to the decrement $\Delta N$ in the speed, it would be possible to make the torque to be $T_1$ at time $t_2$ to begin to accelerate the motor at time $t_2$ to resume the original speed provided that the synchronous speed satisfies a relation $N_{02} - N_{01} \geq \Delta N$.

From the foregoing description, it will be noted that where the source voltage momentarily disappears, the motor can restart to resume the original speed, but unless the output frequency reference signal $e_2$ is also decreased by $\Delta E$ corresponding to the variation $\Delta N$ in the motor speed during the interval $T_c$, the output current of the inverter would be limited to $I_{21}$ which decreases the torque T making it difficult to resume the original speed.

Consequently, how to determine the width of variation $\Delta N$ in the speed presents various problems. For example, as the variation width is greatly influenced by the length of the instantaneous interruption interval $T_c$ and the load condition of the induction motor 15, it is necessary to restart the motor by making the decrement $\Delta E$ of the output voltage frequency reference signal $e_2$ to have sufficiently large margin, that is to make small the primary frequency at the time of restarting. For this reason, it takes a long time to resume the normal rotation and if the decrement were too small it would be impossible to resume the normal or original speed.

SUMMARY OF THE INVENTION

Accordingly, it is an object of this invention to provide an improved method and apparatus for controlling an AC motor capable of returning to the original speed when a source of supply is interrupted for a short interval.

According to one aspect of this invention there is provided a method of controlling a speed of an AC motor energized by a source of alternating current through a frequency converter wherein the speed of the motor is controlled by controlling a primary frequency and a primary voltage of the motor with the frequency converter, the primary voltage is controlled by a closed loop including a minor loop, primary current of the AC motor is controlled by the minor loop and the primary frequency is controlled by an open loop, characterized by the steps of decreasing the primary frequency with the frequency converter at a rate faster than a rate of decrease in a number of revolutions of the motor when the source of alternating current is interrupted and then recovered after a short interval, and accelerating the AC motor to an original speed with the primary current limited to a predetermined value smaller than a value limited by the minor loop while maintaining the primary frequency and the primary current in a predetermined relation.

According to another aspect of this invention there is provided apparatus for controlling a speed of an AC motor energized by a source of alternating current through a frequency converter comprising a closed loop including a voltage detector for controlling a primary voltage supplied to the AC motor from the frequency converter; a minor closed loop including a current detector for controlling a primary current supplied to the AC motor from the frequency converter; an open loop including an input limiter for controlling a primary frequency supplied to the AC motor from the frequency converter, and a limiter connected between the current detector and an input voltage detector responsive to source voltage and the input detector; the limiter and the input limiter being connected to decrease the primary frequency at a rate faster than a rate of decrease in a number of revolutions of the AC motor when the source of alternating current is interrupted and then recovered after a short interval and to accelerate the AC motor to an original speed with the primary current limited to a predetermined value smaller than a value limited by the minor loop while maintaining the primary frequency and the primary current in a predetermined relation.

BRIEF DESCRIPTION OF THE DRAWINGS

In the accompanying drawings:

FIG. 7 is a connection diagram showing a modification of the circuit shown in FIG. 6.

DESCRIPTION OF THE PREFERRED EMBODIMENTS

Figure 1:
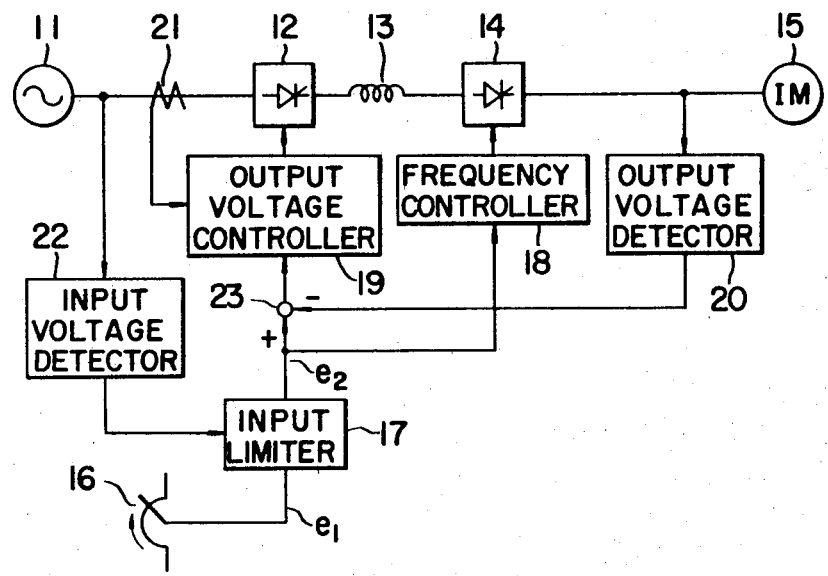
FIG. 1 is a block diagram showing a prior art induction motor control apparatus.
Figure 4:
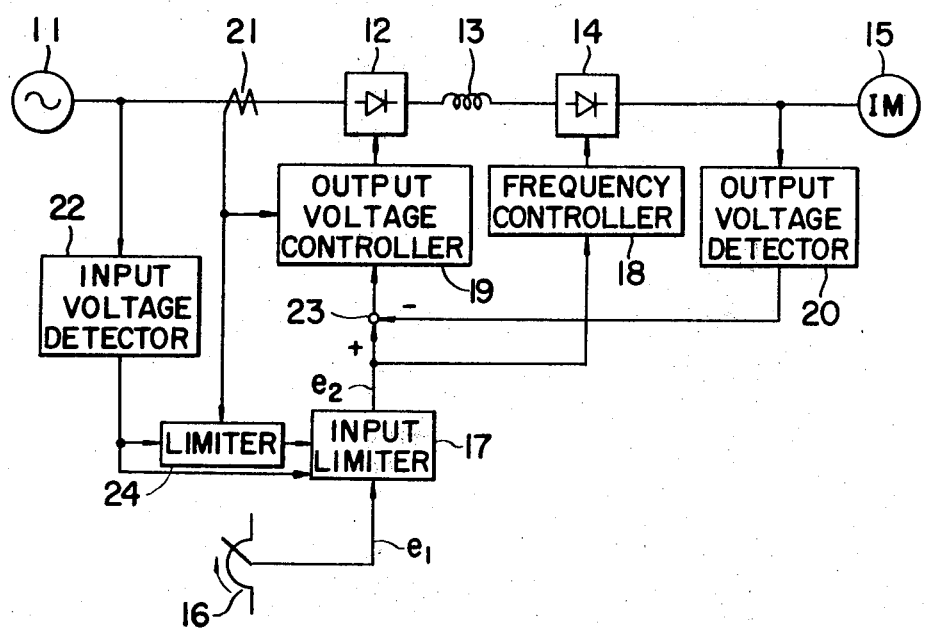
FIG. 4 is a block diagram showing one embodiment of the control apparatus embodying the invention.

In a preferred embodiment of this invention shown in FIG. 4, circuit elements 11 through 23 have the same functions as those shown in FIG. 1.

Figure 2:
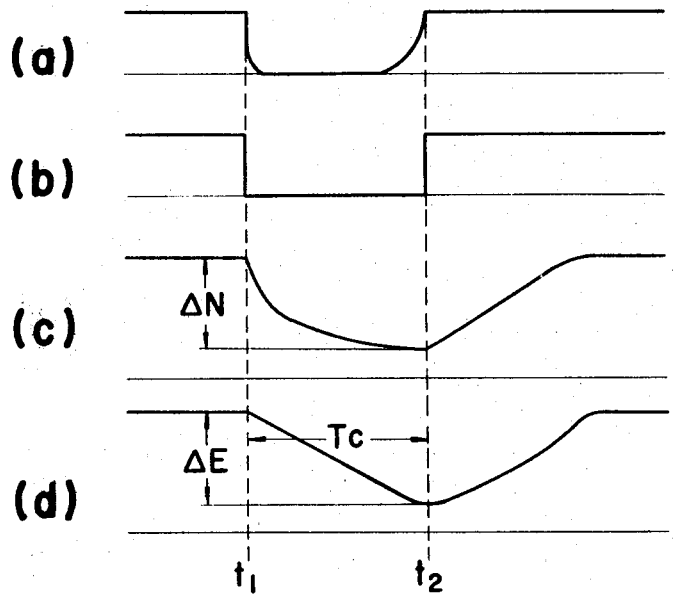
FIG. 2 is a diagram showing the operation mode of the prior art apparatus shown in FIG. 1 at the time of momentary interruption of the supply of an AC power.
Figure 3:
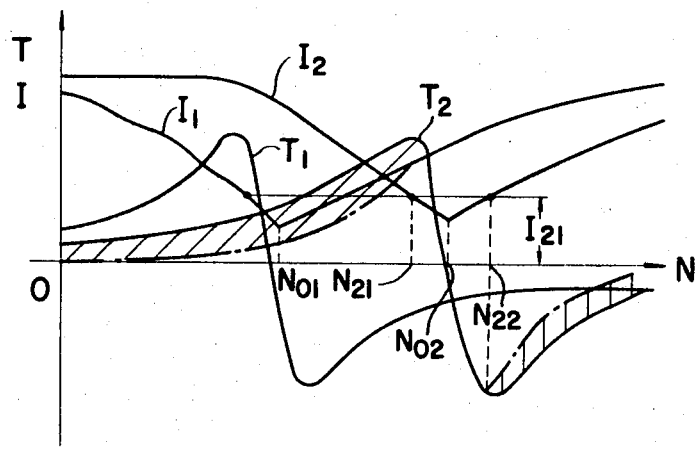
FIG. 3 shows torque-primary current-number of revolutions characteristics of an induction motor.
Figure 5:
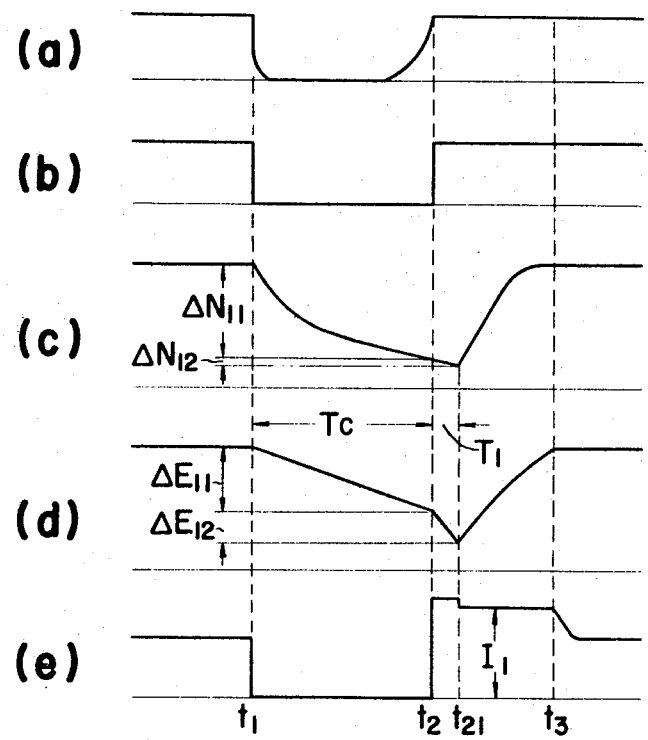
FIG. 5 is a diagram showing the operation mode of the apparatus embodying the invention at the time of momentary interruption of the power supply.
Figure 6:
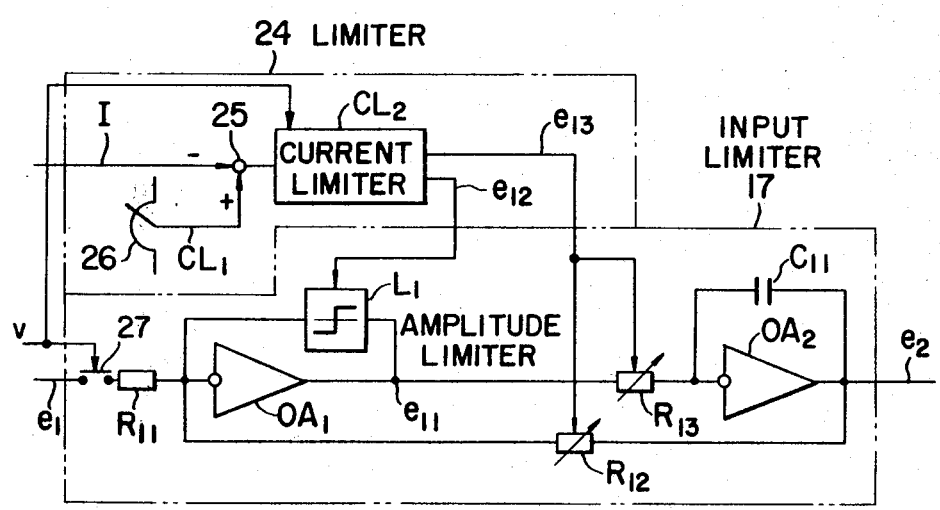
FIG. 6 is a block diagram showing the detail of a portion of the circuit shown in FIG. 4.

According to this invention a limiter 24 is connected between the input voltage detector 22, the input current detector 21 and the input limiter 17. The operation of the limiter 24 will be explained with the aid of the operation mode shown in FIG. 5 and one example of the construction of the input limiter 17 and the limiter 24 is shown in FIG. 6. FIG. 5 shows waveforms of the signals at various portions under a condition when the voltage of the AC source 11 decreases below a predetermined value at time $t_1$ and restores the original or normal value at time $t_2$. In the same manner as in FIG. 2, curve (a) represents the source voltage, curve (b) an operation signal, curve (c) the number of revolutions of the induction motor 15, curve (d) the output voltage frequency reference signal $e_2$ and curve (e) the primary current (input current to the rectifier 12) of the induction motor 15. In the same manner as in FIG. 2, during an interval Tc between times $t_1$ and $t_2$ the operations of the rectifier 12 and the inverter 14 are interrupted, and the recovery of the source voltage is detected by the input voltage detector 22 to restart the rectifier and inverter. As above described when the rectifier and inverter are restarted at time $t_2$, the variation $\Delta N_{11}$ in the speed of the induction motor 15 does not correspond to the variation $\Delta E_{11}$ in the output voltage frequency reference signal $e_2$. More particularly, when $\Delta E_{11}$ is small the induction motor cannot produce a predetermined acceleration torque so that during an interval between times $t_2$ and $t_{21}$ the speed of the motor decreases further by $\Delta N_{12}$. During an interval between times $t_2$ and $t_{21}$ the limiter 24 detects the fact that the source voltage has recovered through the input voltage detector, as well as the fact that the primary current of the induction motor has exceeded a predetermined value through the input current detector 21 so as to decrease the output voltage frequency reference signal $e_2$ by $\Delta E_{12}$ during an interval between times $t_2$ and $t_{21}$ until the primary current of the induction motor reaches a predetermined value $I_1$ smaller than the limiting value of the current or minor control loop. As a consequence, the variation $(\Delta N_{11} + \Delta N_{12})$ in the motor speed will come to have a predetermined relation with respect to the variation $(\Delta E_{11} + \Delta E_{12})$ in the output voltage frequency reference signal $e_2$ so that the motor 15 begins to accelerate at time $t_{21}$ to reach the normal speed at time $t_3$. FIG. 5 shows a case wherein the motor accelerates during an interval betweeen times $t_{21}$ and $t_3$ with its primary current limited to the predetermined value $I_1$.

One example of the circuit that performs this function is illustrated in FIG. 6 in which the input limiter 17 is constituted by operators OA1 and OA2 in the form of operational amplifiers. When there is a difference between the set reference signal $e_1$ and the output voltage frequency reference signal $e_2$, the operator OA1 produces a signal $e_{11}$ with its amplitude limited by an amplitude limiter $L_1$, the signal $e_{11}$ normally controlling the rate of variation of the output signal of the operator OA2, i.e., the output voltage frequency reference signal $e_2$. The rate of variation is determined by a ratio $e_{11}/(R_{13} \cdot C_{11})$ where $R_{13}$ represents the resistance value of a resistor $R_{13}$ connected between operators OA1 and OA2, and $C_{11}$ represents the capacitance value of a capacitor $C_{11}$ connected across the operator OA2. When an equation $e_1/R_{11} = e_2/R_{12}$ holds (where $R_{11}$ represents the resistance value of a resistor $R_{11}$ connected on the input side of operator OA1, and $R_{12}$ the resistance value of a variable resistor $R_{12}$ connected between the input of the operator OA1 and the output of the operator OA2), the output signal $e_{11}$ of the operator OA1 becomes substantially zero, whereby the output voltage frequency reference signal $e_2$ does not vary and is held at a constant value. As shown in FIG. 6, a relay 27 is connected to input voltage detector 22 to be actuated by a source voltage decrease detection signal V so as to be closed under a normal condition but opened under an abnormal condition. In the comparator 25, the output signal I of the input current detector 21 is compared with a primary current limiting value $CL_1$ set by a rheostat 26, and the difference thus detected is inputted to a current limiter $CL_2$ to produce signals $e_{12}$ and $e_{13}$. During the interval Tc between times $t_1$ and $t_2$ shown in FIG. 5, the variation $\Delta E_{11}$ in the output voltage frequency reference signal $e_2$ varies the set reference signal $e_1$ and decreases the resistance value of the resistor $R_{12}$. During the interval between times $t_2$ and $t_{21}$, as the primary current $I_1$ of the motor exceeds a predetermined value $I_1$ as shown in FIG. 5e, the current limiter $CL_2$ would produce signal $e_{13}$ to decrease the resistance values of the variable resistors $R_{12}$ and $R_{13}$ to quickly decrease the output voltage frequency reference signal $e_2$ by $\Delta E_{12}$. When the primary current reduces to the predetermined value $I_1$ at time $t_{21}$, the current limiter $CL_2$ stops producing signal $e_{13}$ and output signal $e_{12}$ for controlling the rate of variation $de_2/dt = e_{11}/R_{13} \cdot C_{11})$ of the output voltage frequency reference value $e_2$ by controlling the amplitude of the output signal $e_{11}$ of the operator OA1 so as to accelerate the motor 15 until time $t_3$ with the primary current limited to the predetermined value $I_1$. Thus, at time $t_3$ the speed of the motor 15 returns to the original value before time $t_1$. Thus, signal $e_{12}$ outputted from the current limiter $CL_2$ is stopped and signal $e_{11}$ becomes substantially to zero because an equation $e_1/R_{11} = e_2/R_{12}$ holds.

As above described according to this invention, when power supply of an AC source is momentarily interrupted the primary frequency of the motor is decreased at a rate faster than the rate of decrease in the motor speed so as to accelerate the motor to the original speed with the primary current limited to a predetermined value while maintaining the relation between the primary frequency and the primary current or voltage such that the motor would produce a predetermined torque. For this reason, it is possible to continue stable operation of the motor under such transient condition as momentary interruption of the AC source.

It should be understood that the constructions of the input limiter 17 and the limiter 24 are not limited to those shown in FIG. 6 and that any combinations of the circuit elements may be used so long as they can decrease the primary frequency (the output voltage frequency reference signal $e_2$) at a rate faster than the rate of decrease in the motor speed.

For example, the circuit shown in FIG. 6 can be modified as shown in FIG. 7 in which the set reference signal $e_1$ is applied to operator OA1 via resistor $R_{11}$ and the output $i_1$ thereof is applied to operator OA2 via resistor $R_{13}$ to produce the output voltage frequency signal $e_2$ and the operator OA2 is shunted by a capacitor $C_{11}$. Resistor $R_{12}$ is connected in the same manner as that shown in FIG. 6. In this case, however, resistors $R_{12}$ and $R_{13}$ are fixed resistors. The connection of the current limiter $CL_2$ and the comparator 25 is similar to that shown in FIG. 6. The output of the current limiter $CL_2$ is supplied to the input of the operator OA2 via a polarity discriminator 30 which outputs $-i_2$ in accordance with the polarity of the output of the comparator 25. Thus, when $i < < -i_2$ the capacitor $C_{11}$ discharges to generate a predetermined output voltage frequency signal $e_2$. Provision of the polarity discriminator 30 makes it possible to use fixed resistors $R_{12}$ and $R_{13}$ so that the current limit $CL_2$ is not required to produce control signals $e_{12}$ and $e_{13}$.

Further, it should be understood that it is not always necessary to decrease the output voltage frequency signal $e_2$ by a predetermined value $\Delta E_{11}$ during momentary interruption of the source of power and that the value $\Delta E_{11}$ may be zero in which case the interval between times $t_2$ and $t_{21}$ becomes slightly longer.

Further, it should be understood that the invention is applicable to any type of the frequency converter.

As above described this invention makes it possible to rapidly resume the original speed of an AC motor and continue its stable running at the time of interruption of the power supply for a short interval.

What is claimed is:

1. In a method of controlling a speed of an AC motor energized by a source of alternating current through a frequency converter wherein the speed of said AC motor is controlled by controlling a primary frequency and a primary voltage of said AC motor with said frequency converter, said primary voltage is controlled by a closed loop including a minor loop, primary current of said AC motor is controlled by said minor loop and said primary frequency is controlled by an open loop, the improvement which comprises the steps of decreasing said primary frequency with said frequency converter at a rate faster than a rate of decrease in a number of revolutions of said AC motor when said source of alternating current is interrupted and then recovered after a short interval, and accelerating said AC motor to an original speed with said primary current limited to a predetermined value smaller than a value limited by said minor loop while maintaining said primary frequency and said primary current in a predetermined relation.

2. Apparatus for controlling a speed of an AC motor energized by a source of alternating current through a frequency converter comprising:
   a closed loop including a voltage detector for controlling a primary voltage supplied to said AC motor from said frequency converter;
   a minor closed loop including a current detector for controlling a primary current supplied to said AC motor from said frequency converter;
   an open loop including an input limiter for controlling a primary frequency supplied to said AC motor from said frequency converter; and
   a limiter connected between said current detector and an input voltage detector responsive to source voltage and said input limiter,
   said limiter and said input limiter being connected to decrease said primary frequency at a rate faster than a rate of decrease in a number of revolutions of the AC motor when said source of alternating current is interrupted and then recovered after a short interval and to accelerate the AC motor to an original speed with the primary current limited to a predetermined value smaller than a value limited by said minor loop while maintaining the primary frequency and the primary current in a predetermined relation.

3. The apparatus according to claim 2 wherein said limiter comprises a comparator which compares said primary current with a predetermined reference current value, a current limiter connected to an output terminal of said comparator for producing a plurality of control signals, and wherein said input limiter comprises a first operator supplied with a speed reference signal, a second operator for producing an output voltage frequency reference signal applied to said primary voltage controlling closed loop and to said primary current controlling minor closed loop, a variable resistor controlled by one of said control signals and connected between said first and second operators.

4. The apparatus according to claim 3 wherein said first operator is provided with an amplitude limiter connected in parallel therewith and controlled by the other of said control signals, and said second operator is provided with a capacitor connected in parallel therewith, and wherein said input limiter further comprises another variable resistor connected between an input terminal of said first operator and an output terminal of said second operator and controlled by the one of said control signals, said limiter and said input limiter determining rates of deceleration and acceleration of said motor when the source of alternating current is interrupted for a short interval.

5. The apparatus according to claim 2 wherein said input limiter comprises a first operator supplied with said set reference signal, a second operator connected to receive an output of said first operator, a capacitor connected in parallel with said second operator, and a resistor connected between an input terminal of said first operator and an output terminal of said second operator, and wherein said limiter comprises a comparator which compares input current to said frequency converter with a predetermined reference current value, a current limiter supplied with an output of said comparator, a polarity discriminator for descriminating a polarity of an output of said current limiter, and means for applying an output of said polarity descriminator so as to cause said second operator to produce an output voltage frequency reference signal.

6. The apparatus according to claim 2 wherein said frequency converter comprises a rectifier and an inverter serially connected between said source of alternating current and said AC motor, said input limiter compares voltage of said source of alternating current with a speed reference signal for producing an output voltage frequency reference signal utilized to control an output frequency of said inverter, and wherein said closed loop further comprises a comparator comparing said output voltage frequency reference signal with said primary voltage, and an output voltage controller responsive to an output signal of said comparator and an output of said current detector for controlling said rectifier.

* * * * *